(12) United States Patent
Johnson et al.

(10) Patent No.: US 12,496,715 B2
(45) Date of Patent: Dec. 16, 2025

(54) THREE-DIMENSIONAL PASSIVE WALKING ROBOT

(71) Applicant: Carnegie Mellon University, Pittsburgh, PA (US)

(72) Inventors: Aaron Johnson, Pittsburgh, PA (US); Sarah Bergbreiter, Pittsburgh, PA (US); Kamal Carter, Pittsburgh, PA (US); Sharfin Islam, Pittsburgh, PA (US); Justin Yim, Pittsburgh, PA (US); James Kyle, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 151 days.

(21) Appl. No.: 18/379,614

(22) Filed: Oct. 12, 2023

(65) Prior Publication Data

US 2024/0123616 A1    Apr. 18, 2024

Related U.S. Application Data

(60) Provisional application No. 63/415,316, filed on Oct. 12, 2022.

(51) Int. Cl.
*B25J 9/16* (2006.01)
*B62D 57/032* (2006.01)

(52) U.S. Cl.
CPC .......... *B25J 9/1664* (2013.01); *B62D 57/032* (2013.01)

(58) Field of Classification Search
CPC .............................. B25J 9/1664; B62D 57/032
See application file for complete search history.

(56) References Cited

U.S. PATENT DOCUMENTS

| 7,163,430 | B1 | 1/2007 | Lund et al. | |
| 2006/0241809 | A1* | 10/2006 | Goswami | B62D 57/032 700/245 |
| 2012/0072026 | A1* | 3/2012 | Takagi | B25J 9/1633 901/1 |

(Continued)

FOREIGN PATENT DOCUMENTS

| CN | 2605903 Y | 3/2004 |
| CN | 110181541 A | 8/2019 |

(Continued)

OTHER PUBLICATIONS

Collins, Steven H. et al. "A three-dimensional passive-dynamic walking robot with two legs and knees." The International Journal of Robotics Research 20, No. 7 (2001): 607-615.

(Continued)

*Primary Examiner* — Harry Y Oh
(74) *Attorney, Agent, or Firm* — Michael G. Monyok

(57) ABSTRACT

A bipedal walking robot uses a quasi-passive control scheme and a simplified mechanical design. The walking robot has a pair of legs connected to a body through a passive hip joint, which is offset from a center of gravity of the walking robot. A nonconcentric, curved foot is attached at to each leg by a prismatic joint. Extension and retraction of the prismatic joint initiates the walking sequence of the robot, with each foot retracted during the swing phase and extended during the stance phase. Directional changes are controlled by changing a phase offset in the actuation of each foot.

18 Claims, 6 Drawing Sheets

(56) References Cited

U.S. PATENT DOCUMENTS

| | | | | |
|---|---|---|---|---|
| 2012/0197435 A1* | 8/2012 | Maisonnier | .......... | B62D 57/032 |
| | | | | 901/1 |
| 2013/0184861 A1* | 7/2013 | Pratt | .................... | G05D 1/0891 |
| | | | | 901/1 |
| 2014/0100697 A1* | 4/2014 | Goulding | ................... | B25J 5/00 |
| | | | | 901/1 |
| 2015/0120044 A1* | 4/2015 | Cory | .................... | B62D 57/032 |
| | | | | 700/250 |
| 2017/0010620 A1* | 1/2017 | Watabe | ................ | G05D 1/0248 |

FOREIGN PATENT DOCUMENTS

| | | | |
|---|---|---|---|
| CN | 114601450 A | * | 6/2022 |
| JP | 2005169029 A | | 6/2005 |

OTHER PUBLICATIONS

Collins, Steven H. et al. "A bipedal walking robot with efficient and human-like gait." In Proceedings of the 2005 IEEE international conference on robotics and automation, pp. 1983-1988. IEEE, 2005.
Aoyama, Tadayoshi et al.. "Stabilizing and direction control of efficient 3-D biped walking based on PDAC." IEEE/ASME transactions on mechatronics 14, No. 6 (2009): 712-718.
Yim, J. et al. "3D passive dynamics-inspired walking actuated by open loop leg extension", Carnegie Mellon University, Robomechanics Lab, 2021.

* cited by examiner

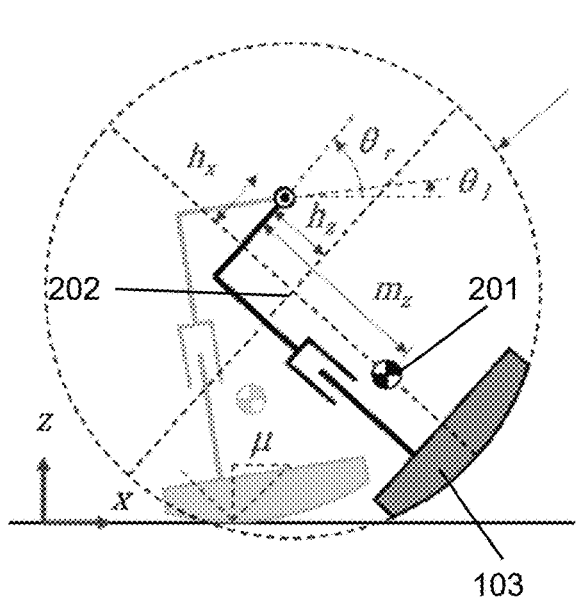
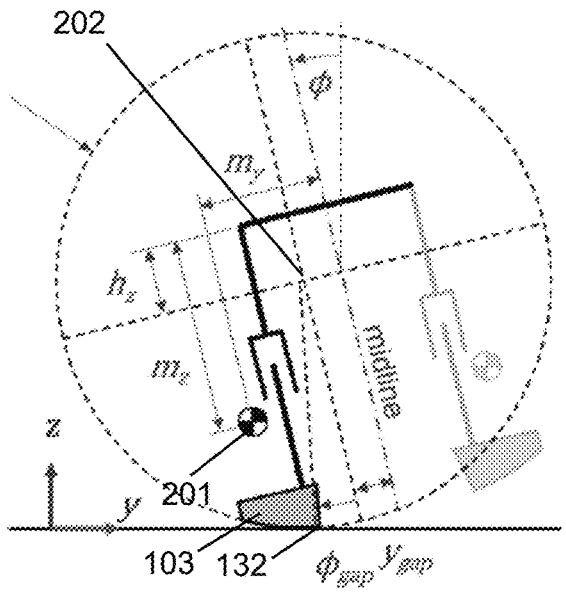
FIG. 2A    FIG. 2B
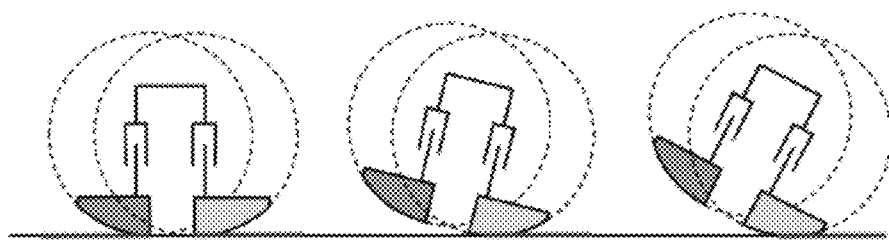
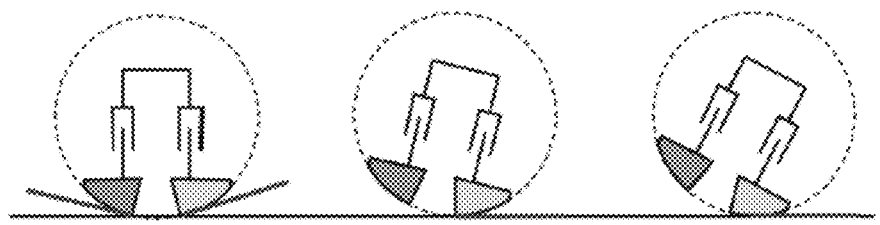
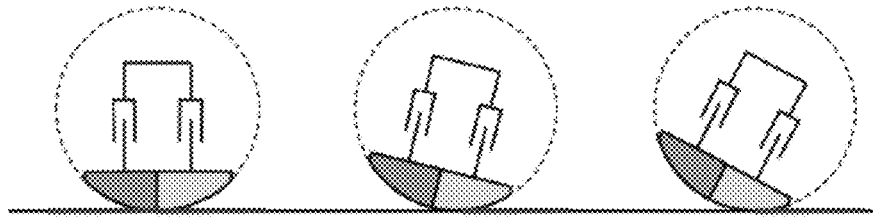
FIG. 3

THREE-DIMENSIONAL PASSIVE WALKING ROBOT

CROSS-REFERENCE TO RELATED APPLICATIONS

This application claims the benefit under 35 U.S.C. § 119 of U.S. Provisional Application Ser. No. 63/415,316, filed on Oct. 12, 2022, which is incorporated herein by reference.

STATEMENT REGARDING FEDERALLY SPONSORED RESEARCH

This invention was made with United States government support under CCF2030859 and IIS1813920 awarded by the National Science Foundation. The U.S. government has certain rights in the invention.

BACKGROUND OF THE INVENTION

The present disclosure generally relates to walking robots. More specifically, the disclosure relates to a system and method to control the movement of an untethered, bipedal walking robot.

Bipedal robots present a unique problem in the need for both stability and motion control. Bipedal robots can be controlled externally or with complex sensor-based control systems. Alternatively, these robots can have quasi-passive control systems, where the design is based on passive dynamics with open loop stability, yet may include actuators for propulsion and/or steering. Prior quasi-passive walking robots, or walkers, tend to be large, have complicated mechanical designs, and require precise feedback control and/or learning algorithms. For smaller robots, these attributes limit the ability incorporate the necessary components for actuation, control, and sensing. There have been previous efforts at developing bipedal walkers with minimally complex designs. One such effort was modeled on walking toys, where the robot could maintain a stable gait down a slope without any actuation or control. However, this design is not feasible on flat or inclined ground as the energy injected into the system is provided by gravity only. Other quasi-passive walkers have used curved feet to initiate a waddling-type gait. These prior attempts have used curved feet with a common center of curvature, meaning the curved bottom surface of each foot appear to fall on a single circle drawn around them, thus limiting the ability to self-start and the speed and frequency of the gait. Further, these quasi-passive walkers couple the front and sagittal plane, which creates trouble in compensating for unwanted yaw oscillation, making it difficult to control the direction of movement. To overcome this oscillation, others have switched to a flat foot spring design for the walker, preventing the walking robot from pivoting on the curved foot surface.

For flat ground walking, energy has to be injected into the system to overcome frictional losses. Prior works have used complex mechanical designs, such as using actuated hip and ankle joints on each leg, using actuated ankles to roll and pitch the lean of the walker, placing springs in flat feet, or using pneumatic artificial muscles to roll and pitch the entire robot. With these complicated actuation designs, complex feedback control schemes are required to coordinate the various joints. Many also require sensory feedback to maintain a stable and robust gait. These complex mechanical designs limit the ability to implement the system in a small robot.

Therefore, it would be advantageous to develop a walking robot with reduced mechanical complexity and control to expand the potential applications for bipedal walkers, particularly in applications where a small robot is desired.

BRIEF SUMMARY

According to embodiments of the present disclosure is active bipedal walking robot with a simple design and control scheme. In addition to maintaining a stable gait on flat ground, the robot does not require exact initial conditions, and can self-start from a standing posture, has a wide range of parameters in which it can maintain a stable gait, and shows the potential to control the yaw without actuation of that specific degree of freedom. In one embodiment, the robot has nonconcentric curved feet, which produces stable walking at a wide range of control amplitudes and frequencies. In addition, the front and sagittal planes are coupled using a passive hip with a forward offset. The walker comprises a body connected to the two upper legs by the passive hip joint and two spherical feet connected to the upper legs by an actuated prismatic joint. In an alternative embodiment, the walking robot has two rigid bodies comprising a leg and foot, where the rigid bodies are connected to an actuator pivoting the legs about a hip axis.

The simple designs permit use on smaller scales as the walker can be constructed at reduced sizes compared to previous designs. At these smaller scales there is limited space and power available, and so the control method leverages the passive dynamics of walking to reduce the burden on the actuators and controllers. The robot requires no feedback as each actuator is controlled by an open-loop sinusoidal profile.

BRIEF DESCRIPTION OF THE SEVERAL VIEWS OF THE DRAWINGS

FIGS. 2A-2B are static models of the walker in the front and sagittal planes.

FIG. 3 depicts various configurations of the walker's feet.

DETAILED DESCRIPTION

Figure 1:
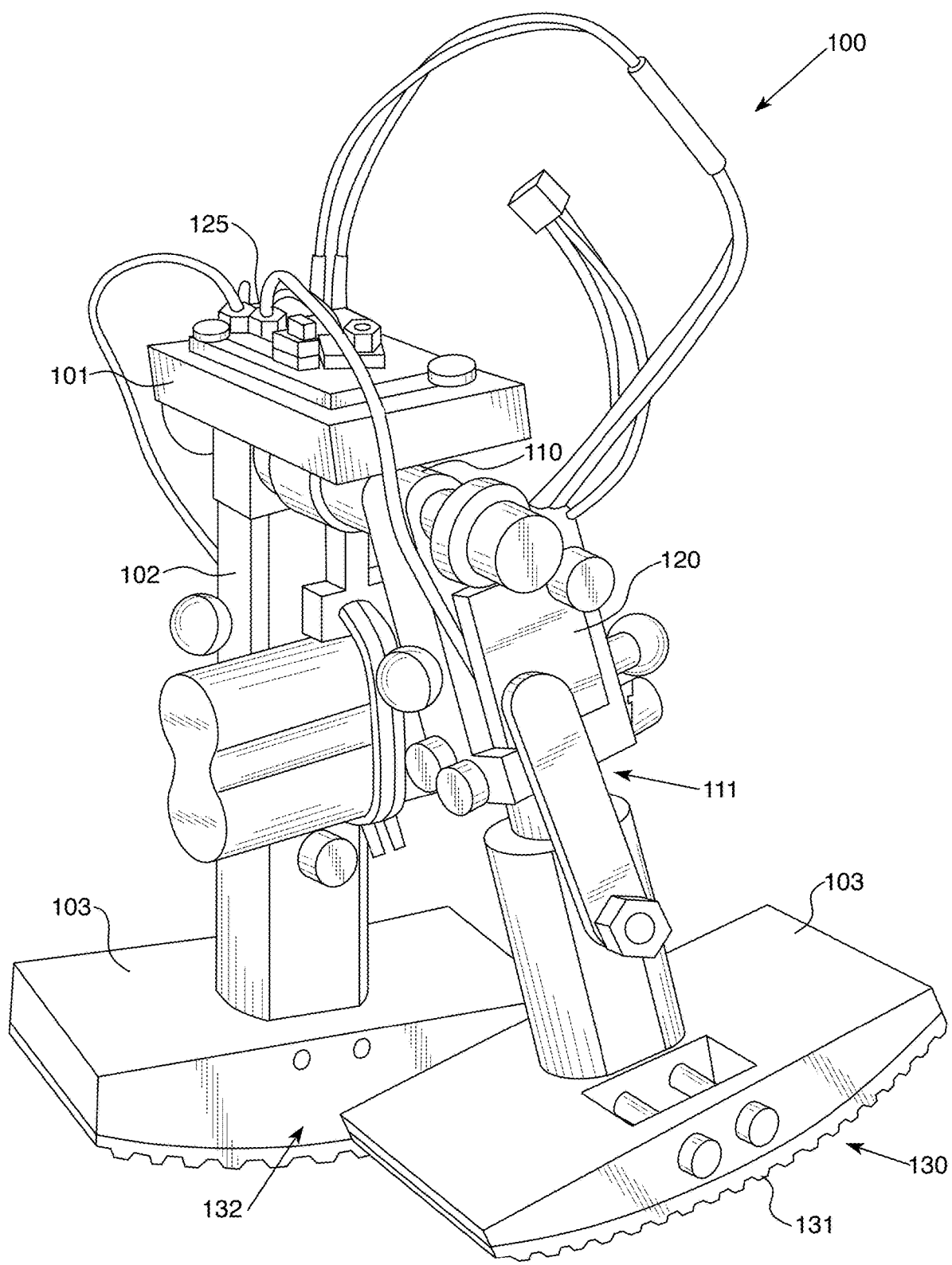
FIG. 1 shows a walker according to one embodiment.

According to embodiments of the disclosure is a walking robot, or walker 100, comprising a torso 101, a pair of upper legs 102, and a pair of spherical feet 103. As shown in FIG. 1, each upper leg 102 is attached to the torso 101, or body, through a passive hip joint 110. An actuated prismatic joint 111 connects each upper leg 102 to its corresponding spherical foot 103. A prismatic joint 111 permits a sliding motion of each foot 103 along a common longitudinal axis with each leg 102, without rotation or bending. The prismatic joint 111 is extended and retracted using an actuator 120 or similar device, such as a pneumatic actuator, electric motor, linear MEMS actuator, electromagnetic actuator, solenoid, or linear actuator. In the embodiment shown in FIG. 1, the hip joint 110 has a forward offset from the center of gravity of the walker 100.

The parts (101, 102, and 103) of the walker 100 can be formed from polymers, metals, composites, or other rigid, lightweight materials. In one example embodiment, the walker 100 parts (101, 102, and 103) are 3D printed from polylactic acid. In this example, each foot 103 has a non-slip material attached to the bottom surface 130, acting as treads 131. The passive hip joints 110 are plastic bushings pivoting on a ¼" aluminum rod. Each leg 103 is assembled from a Dynamixel XL-320 servo, a two-part housing for the servo, and a two-part crank-link mechanism in which the servo extends or retracts the foot 103. The torso 101 houses an OpenCM9.04 controller 125 and a 7.4V lithium-ion battery hangs below the hip joint 110. The controller 125 controls the actuation of each prismatic joint 120 according to a control method discussed in further detail below.

FIGS. 2A-2B depict a static model of the walker 100 in both the sagittal plane (FIG. 2A) and the frontal plane (FIG. 2B). The generalized coordinates are the Cartesian coordinates of the center of the hip axle, the angles of the legs ($\theta_l$, $\theta_r$ in the sagittal, and $\phi$ in the frontal plane), and the two leg lengths. As shown in FIGS. 2A-2B, the center of gravity 201 is positioned below the center of curvature 202 of the feet 103. The center of curvature 202 is the center of a circle drawn through the curved, bottom surface 130 of each foot 103. Also shown in FIG. 2B is a gap between each spherical foot 103. For the purposes of the model shown in FIGS. 2A-2B, the center of curvature 202 depicted is the center of curvature 202 for the foot 103 in contact with the ground.

In the example embodiment depicted in FIGS. 2A-2B, the radius of curvature (r) is 15.2 cm, the distance between the center of curvature ($y_{gap}$) 202 for each foot 103 is 0.9 cm, the angle ($\phi_{gap}$) of the foot 103 interior edges 132 is −0.136 radians, the height ($h_x$) from the center of curvature 202 to the hip joint 110 is 0.8 cm, the center of mass ($m_y$, $m_z$) relative to the hip joint 110 is 8.1 cm, the moment of inertia ($I_{leg,xx}$, $I_{leg,yy}$) of each leg 102 is 6 kg*cm2, and the mass (m) of each leg 102 is 136 g.

The distance between the center of curvature ($y_{gap}$) 202 for each foot 103 and the angle ($\phi_{gap}$) of the foot 103 interior edges 132 are both related to the foot shape, and the constraints on these parameters ensure the spherical feet 103 remain tangent to the ground and add to the stability of the walker 100. As shown in FIG. 2B, the angle of the foot ($\phi_{gap}$) is the angle measured between the centerline and foot, as measured at the center of curvature 202. Despite using a passive hip joint 110, the constraints on the height ($h_x$) from the center of curvature 202 to the hip joint 110 and the center of mass ($m_z$) ensure the legs 102 swing forward when they gain ground clearance. Without constraints on these parameters, the walker 100 would not move forward. Table I, shown below, shows the design constraints for these parameters to ensure stable walking.

TABLE I

| Design Rule | Description |
| --- | --- |
| $-h_z + m_z > 0$ | CG below radius of curvature for static stability |
| $y_{gap} > 0$ | Positive separation between feet centers of curvature |
| $\phi_{gap} \leq 0$ | Foot rests of curved surface when standing upright |
| $h_x > 0$ | Forwards hip offset initiates forwards walking |
| $m_z > 0$ | CG below hip so that the leg hangs downwards in swing |

A demonstration of the impact of different foot 103 geometries are shown in FIG. 3. The top row of FIG. 3 shows non-concentric feet 103 (i.e. the spheres defining the curvature of each foot 103 do not overlap) having a gap of 0.9 cm and a $\phi_{gap}=0$, the middle row shows concentric feet 103 and a $\phi_{gap}>0$, and the bottom row shows concentric feet 103 with $\phi_{gap} \sim 0$. The other design parameters are held constant for each of the three scenarios depicted in FIG. 3.

The walker 100 does not require feedback sensing for control. Each leg is controlled by a sinusoidal trajectory with an amplitude A, nominal length $h_{z,0}+r$, and frequency $\omega$ offset by 180° between the two legs 103 as follows in equations (1) and (2). While a sinusoidal trajectory is described in these equations, other trajectories following a periodic waveform can be used.

$$l_r^d = (h_{z,0}+r) + A \sin(\omega t) \qquad (1)$$

$$l_l^d = (h_{z,0}+r) + A \sin(\omega t + 180°) \qquad (2)$$

To turn while waking, the phase offset in equation (2) is modified to be less than 180° for turning left and greater than 180° for turning right.

This actuation control scheme results in the stance leg extended past nominal length during the stance phase and retracted during the swing phase. During double stance, with a phase offset of 180°, both legs 103 are at the nominal length. The stance leg 103 extending and the swing leg 103 retracting allow for increased swing leg clearance. Note that unlike previous control schemes that inject energy by extending the leg at the transition out of stance, energy injection for the walker 100 occurs during the continuous stance phase. This open loop control method also shows that the exact trajectory of the legs 103 does not matter as long as energy that is lost is reinjected by the actuators 120. As a result, the walker 100 does not require feedback for a simple walking gait. This open-loop control method achieves this goal at a variety of amplitudes and frequencies for multiple foot 103 configurations.

To measure the forward speed and walking stability, a range of parameters in the sagittal plane are tested in a non-physical simulation. The simulation tests the sagittal plane model at different frequencies and amplitudes of oscillations. The results from the simulation indicate that there is a negative correlation between the frequency and walking speed. As the frequency of leg extension increases for any given amplitude, the walker 100 moves slower. In addition, there is a minimum frequency for the walker 100 to successfully walk forward. The walker 100 is self-starting and sufficient energy is required to be injected by the prismatic joints 111 for the legs 102 to gain initial clearance off the ground. Finally, while the simulations indicate a 'valid' solution around $\omega=0.75$ Hz and starting from A=2.5 mm, these are not physically possible since the roll would not allow the legs 102 to swing forward.

Figure 4:
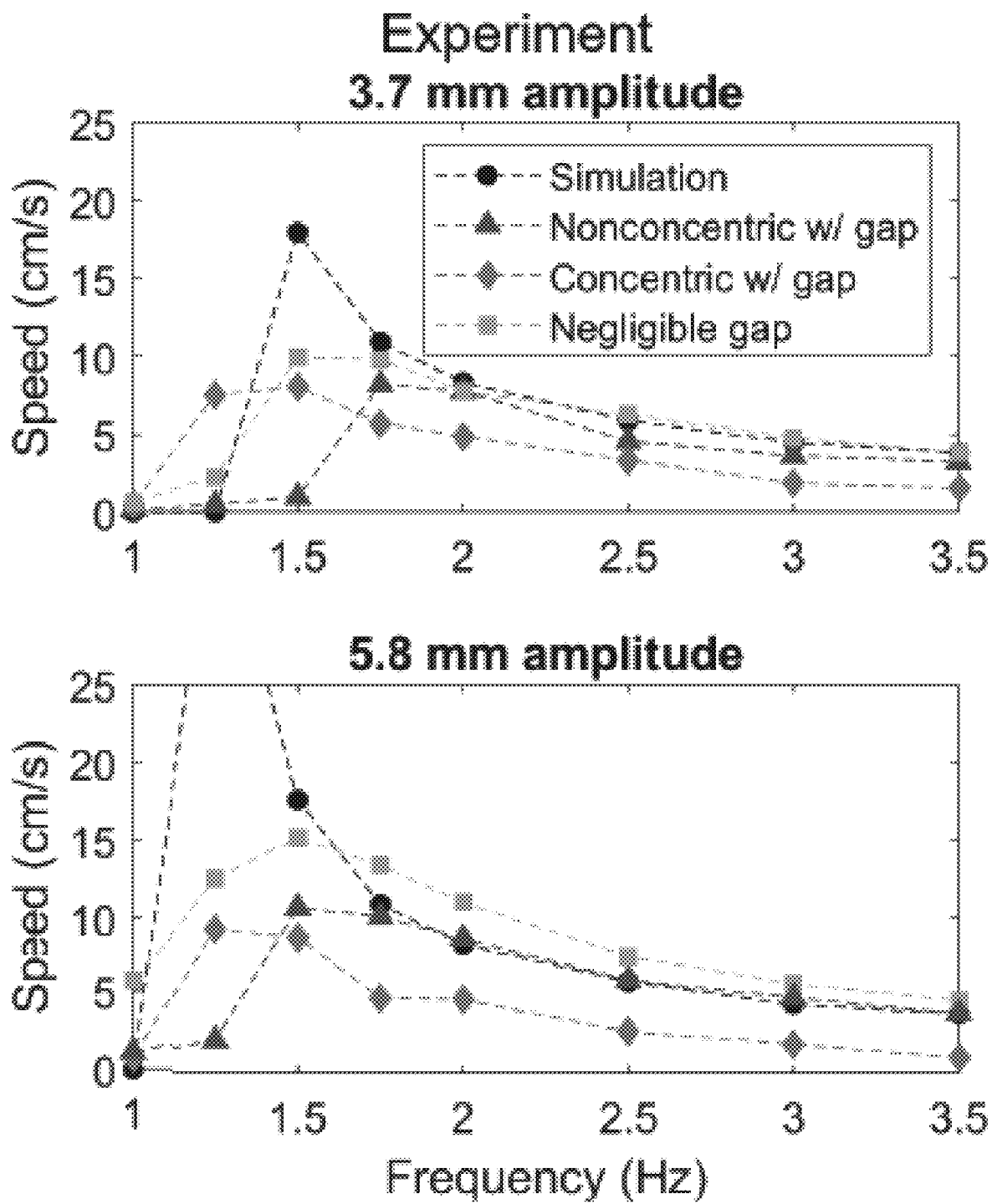
FIG. 4 is a pair of graphs showing the walking speed of the walker at various frequencies.

Forward walking tests on the robot 100 follow similar trends as the simulation results. Self-starting trials were initiated from a standing posture and reached a maximum speed of 140 mm/s, or about one leg 103 length per second. FIG. 4 shows the results for different frequencies, amplitudes, and foot 103 geometries. There is a negative relationship between velocity and frequency, following the simulation results.

The walker 100 was unable to make forward progress at low frequencies both in simulation and experimental tests, but the simulation predicted a minimum frequency for walking that was slightly too low and corresponded to a very high peak forward walking speed not seen in the physical experiment. The simulation was most accurate for the non-concentric gap scenario. The median absolute error in velocity was 0.69 cm/s for the nonconcentric gap case, 1.46 cm/s for the negligible gap case, and 3.34 cm/s for the concentric gap case.

Figure 5:
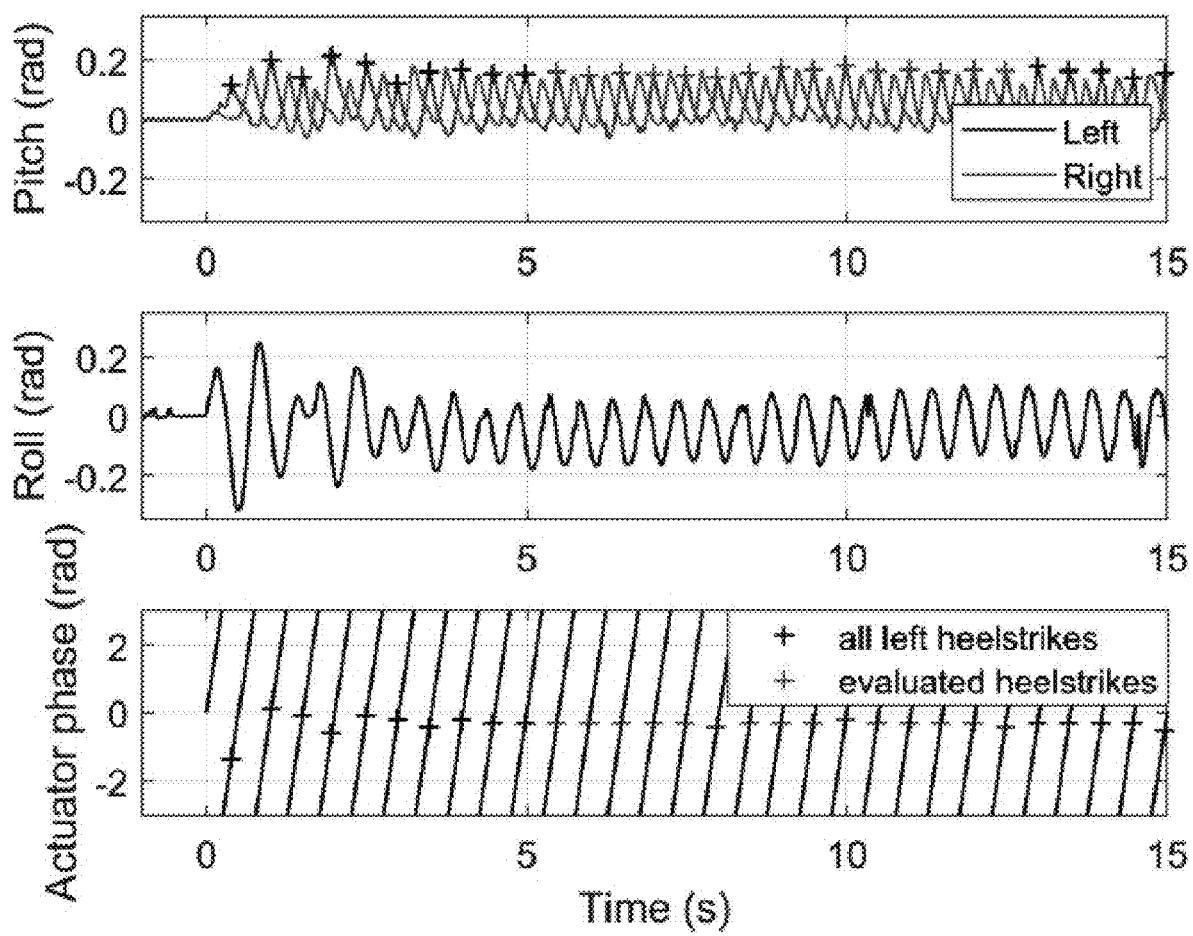
FIG. 5 are a series of graphs showing the pitch, roll, and actuator phase over time of a walking robot.

For frontal plane simulation and testing, each combination of frequency and amplitude was evaluated by its consistency and roll bias into three categories: good walking, leaning, and inconsistent. Example roll and pitch data collected from motion capture experiments are shown in FIG. 5. The experimental data are for a walker 100 tested with nonconcentric gap feet 103, a 5.8 mm amplitude, and a 2 Hz frequency. The top graph in FIG. 5 depicts the pitch of the left and right feet 103 with marks indicating heel strikes. In experiments, heel strike is detected when the pitch velocity reverses from positive to negative. The middle graph of FIG. 5 is roll data and the bottom graph is the actuator 120 phase at heel strike calculated by a sinusoidal trajectory.

Most prior quasi-passive walkers use spherical feet having a concentric center of curvature with a non-negligible gap. However, the walker 100 of the present disclosure behaved more consistently both in simulation and in physical testing with non-concentric feet. Nonconcentric feet had the lowest median actuator standard deviation (STD) for both simulation and experimental results, with a STD (rad) for the experimental results of 0.1424, 0.1524, and 0.2641 for nonconcentric, concentric gap, and concentric/no gap, respectively. There is a large region of consistent behavior for non-concentric feet with a gap, allowing for a significant range of parameter variation.

Figure 6:
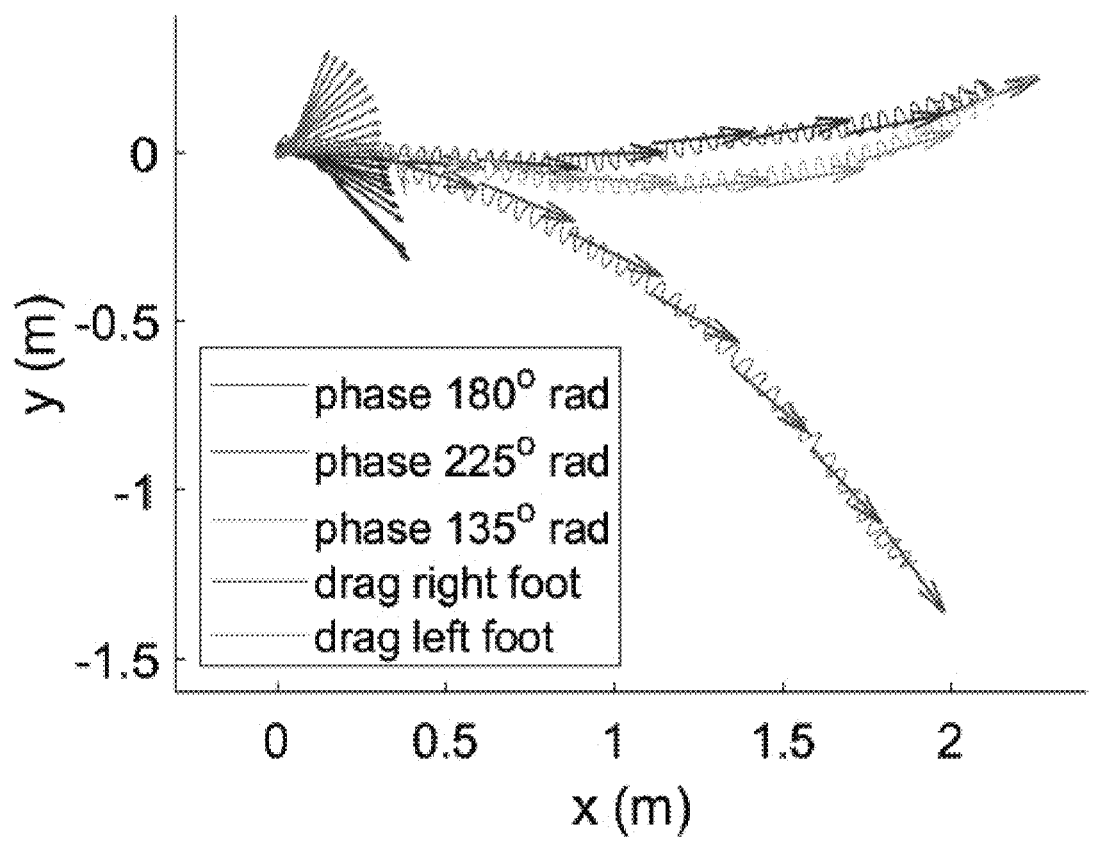
FIG. 6 is a graph depicting the directional change of a walker in response to a phase offset.

Yaw compensation has been a common problem for passive walkers with spherical feet. In these prior works, the walking robot would experience unwanted rotation on the spherical feet, changing the direction of travel. Several prior works have avoided this problem by implementing statically equivalent flat foot spring feet to increase ground contact and avoid unwanted yaw sway. Other solutions have included integrating counter swinging arms to provide counter torque to the unwanted yaw motion, complicating the design of the robot. Despite having spherical feet and no arms, the walker 100 of the present disclosure is able to direct its heading by simply changing feed-forward control parameters. FIG. 6 is a graph showing horizontal plane trajectories (position and heading) in turning trials using phase offset between legs 102 and foot 102 dragging. As shown in FIG. 6, the heading of the walker 100 is controlled by changing the sinusoidal phase offset shown in equation (2). These results show that the direction of the robot walker 100 can be controlled with a simple phase offset. A more extreme turn is also shown in FIG. 6 and was accomplished by fixing one leg 102 at a short length rather than extending and retracting it, dragging that foot 103.

The quasi-passive walker 100 can be quite simple, having only a single actuator 120 per leg 102, a total of 5 rigid bodies forming the structure of the robot, and does not require any feedback control for a simple stable gait. Despite this simplicity, the walker 100 demonstrates stable walking over a range of actuation parameters, control over the heading, and the ability to start and stop from a standing posture.

Figure 7:
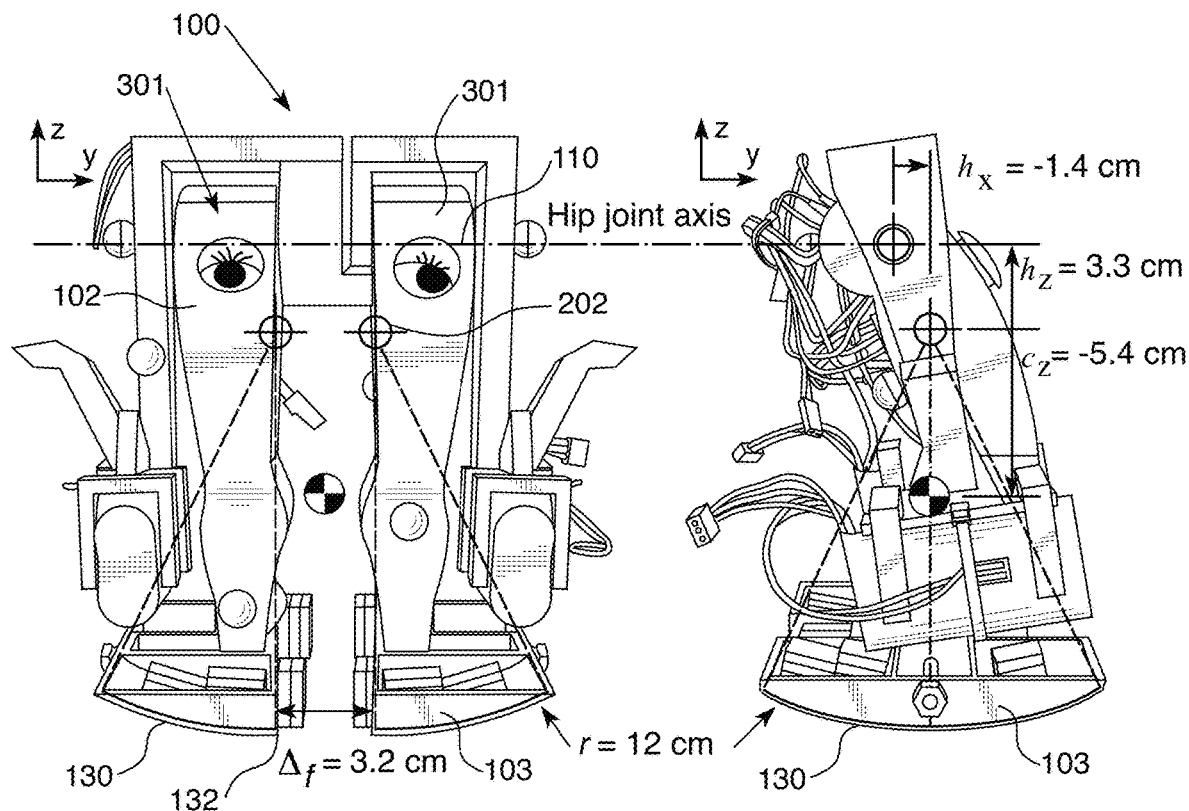
FIG. 7 shows a walker according to an alternative embodiment.

In an alternative embodiment, shown in FIG. 7, a bipedal walker 100 uses a simpler design, where the number of actuators 120 is reduced to one and the walker 100 is comprised of only two rigid bodies 301. Each rigid body 301 is a leg 102 terminating in a foot 103 with a curved bottom surface 130, without a movable joint between the leg 102 and foot 103. Actuation involves a revolute hip joint 110 at the intersection of the two rigid bodies 301. Each of the rigid bodies 301 may contain one battery for balance and to increase the moment of inertia about the vertical axis and move the leg 102 center of gravity closer to the center line. Bringing the center of gravity of each rigid body 301 closer to the center reduces the coupled yaw motion when the legs 102 swing.

Unlike the embodiment shown in FIG. 1, the hip-actuated walker 100 must initiate a walking motion without raising the feet 103. To walk, the walker 100 must lift and advance its feet 103 while balancing and steering. With only one actuator 120 in the walker 100, careful mechanical design enables the actuator 120 to perform all of these tasks simultaneously. Table II, shown below, details the design parameters used in this embodiment.

TABLE II

| Parameter | symbol | value | units |
|---|---|---|---|
| Mass | m | 809 | grams |
| Total height | h | 18.5 | cm |
| Foot radius | r | 12 | cm |
| CG Z offset | $c_z$ | −5.4 | cm |
| Hip Z offset | $h_z$ | 3.3 | cm |
| Hip X offset | $h_x$ | −1.4 | cm |
| Hip height | $r + h_z$ | 15.3 | cm |
| Foot gap | $\Delta_f$ | 3.2 | cm |

The hip-actuated walker 100 utilizes feet with a large radius to balance the robot 100 by rolling it towards the upright position when tipped. This passive stability requires the robot's center of gravity to be below the foot center of curvature 202 ($c_z$<0). The feet 103 must also be long enough to accommodate the range of tipping angles the walker 100 excites during its walk so that it does not pivot over the rear (i.e. 'heel') or front (i.e. 'toe') portion of the foot 103 and fall down.

With wide and relatively flat feet 103, the legs 102 must be made long enough to lift them. To permit this motion, the hip joint 110 is located above the foot center of curvature 202 ($h_z$>0). If the hip is not located above the foot center of curvature 202, rotation of the hip joint 110 will not effectively advance the leg 102 in the swing phase. With the foot 103 lifted from the ground, the leg 102 must swing forward to enable the robot 100 to walk forwards. In the hip-actuated walker 100, the hip 110 axis is located behind the walker 100 center of gravity and the foot center of curvature 202 when the walker 100 stands upright with its feet 103 together ($h_x$<0). With the hip joint 110 displaced towards the rear of the walker 100, an asymmetry is introduced that biases the walker 100 to step forwards: when the hip joint 110 is rotated away from zero degrees with the legs 102 aligned, the retreating leg 102 is pushed into the ground while the advancing leg 102 is slightly raised, biasing the advancing leg 102 to lift off the ground instead of the retreating leg 102.

As with the walker 100 shown in FIG. 1, the hip-actuated walker 100 includes hemispherical feet 103 with a positive gap between the centers of curvature 202 ($\Delta_f$>0). This design leads to steady walking at a large range of frequencies. This trait is useful in the hip-actuated walker 100, where the roll and leg swing motions are coupled and must both be excited by one actuator 120.

Finally, the moment of inertia about the vertical axis and torque of the single actuator 120 must be high enough to break the friction of the feet 103 standing on the ground in order to begin walking. If these parameters are too low or the foot gap or friction are too large, then the walker 100 will spin in place without lifting its feet 103 and will fail to walk. A summary of the design parameters are shown below in Table III.

TABLE III

| No. | expression | description |
|-----|------------|-------------|
| 1 | $c_z < 0$ | CG below foot radius |
| 2 | $h_z > 0$ | hip above foot radius |
| 3 | $h_x < 0$ | hip behind CG |
| 4 | $\Delta_f > 0$ | foot radii displaced laterally |
| 5 | — | torque & inertia break foot friction |

The general process of walking for the hip-actuated walker 100 follows this sequence: (1) the walker 100 begins standing with both feet 103 together and its hip joint 110 actuator 120 is commanded to follow a time-based oscillatory trajectory; (2) hip rotation lifts the left leg 102 ahead of the walker 100 due to the hip axis being behind the center of gravity (assuming a left foot 103 first scheme, with process reversed for right foot 103); (3) with the left foot 103 in the air and ahead of the right foot 103, the walker 100 pitches forward and rolls left; (4) the hip angle reaches its peak and the left leg 102 begins to swing back, then the left foot 103 contacts the ground; (5) due to the left foot's 103 impact with the ground, the right foot 103 and leg 102 lifts up; and (6) since the walker 100 has rolled left, the right leg 102 has clearance to swing past the left leg 102, beginning the process again from the third step with the roles of the legs 102 swapped.

Figure 8:
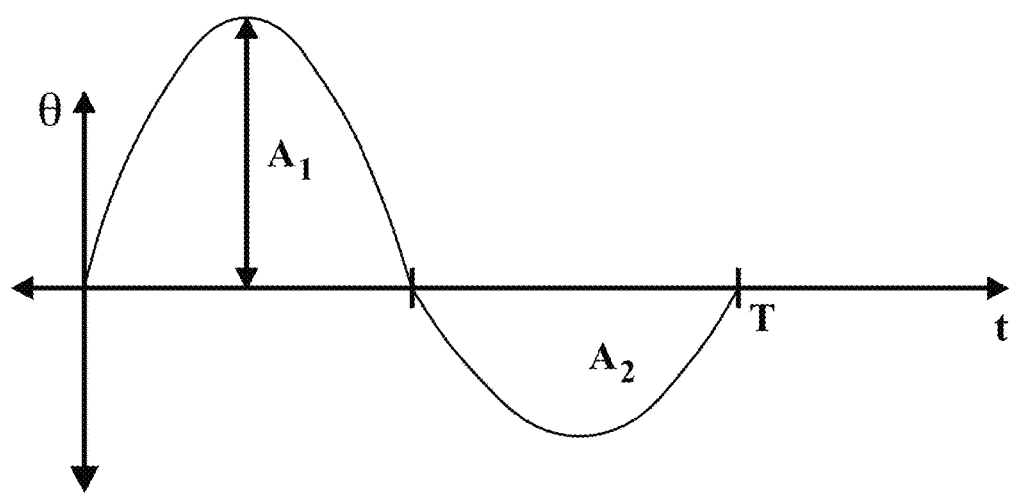
FIG. 8 is a graph visualizing input signals for control of a hip-actuated walker.

For a symmetric walker 100 executing a symmetric gait, the walker 100 can be expected to walk in a straight line. To turn, the actuator 120 must introduce an asymmetry between the left and right steps. The asymmetry can include a faster leg swing velocity or a larger leg swing amplitude, for example. In one control method for the hip-actuated walker 100, the legs 102 are controlled using a piecewise sinusoid according to the following equation and visualized in FIG. 8. The sinusoid is broken at the midpoint into two sections, one half period for each leg swing. Each half has its own amplitude, $A_n$, but the same period. Turning can be accomplished by varying leg swing amplitudes asymmetrically with a larger peak on one side than the other $$\theta(t) = \begin{cases} A_1 \sin(wt) & \mod(t, T) < \frac{T}{2} \\ A_2 \sin(wt) & \mod(t, T) \geq \frac{T}{2} \end{cases}$$

A hip-actuated walker 100 following this control scheme can achieve a maximum walking speed of 16 cm/s at a command leg swing frequency of 1.5 Hz and a command leg swing amplitude of 42°. The leg swing frequency threshold at which walking transitions from unstable to stable occurs below a frequency where roll oscillation and leg swing do not synchronize to produce stable walking. With respect to maximum speed for any given amplitude, this tends to occur around the threshold for stability, which is around the lowest stable operating frequency. Unexpectedly, an increasing leg swing amplitude does not increase roll amplitude, likely due to an increased angular velocity of the swing leg translating into a higher inertial force pulling the walker 100 to center.

When used in this specification and claims, the terms "comprises" and "comprising" and variations thereof mean that the specified features, steps, or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure. Although certain example embodiments of the invention have been described, the scope of the appended claims is not intended to be limited solely to these embodiments. The claims are to be construed literally, purposively, and/or to encompass equivalents.

What is claimed is:

1. A walking robot comprising:
    a torso comprising a hip joint;
    a first leg and a second leg pivotally connected to the torso via the hip joint;
    a first foot connected to the first leg and a second foot connected to the second leg,
        wherein each of the first foot and the second foot have rounded bottom surfaces, wherein the rounded bottom surfaces form a radius of curvature,
        wherein the first foot and the second foot are tangent to a surface when at rest; and
    a controller actuating an extension of the first foot and the second foot,
    wherein a center of gravity of the walking robot is below a center of the radius of curvature for the first foot and the second foot.

2. The walking robot of claim 1, wherein the first foot is connected to the first leg via a first prismatic joint and the second foot is connected to the second leg via a second prismatic joint.

3. The walking robot of claim 1, wherein the first prismatic joint and the second prismatic joint do not permit flexion.

4. The walking robot of claim 1, wherein the hip joint is offset from a center of gravity of the walking robot.

5. The walking robot of claim 4, wherein the hip joint is positioned forward of the center of gravity of the walking robot.

6. The walking robot of claim 1, wherein a center of gravity of the walking robot is below the hip joint.

7. The walking robot of claim 1, wherein the controller creates a sinusoidal trajectory for the first foot and the second foot.

8. The walking robot of claim 1, wherein the controller creates a periodic waveform trajectory for the first foot and the second foot.

9. A method of controlling a bipedal walking robot having a pair of feet with rounded bottom surface, each foot connected to a leg through a prismatic joint, the method comprising:
    extending the feet in a periodic trajectory having an amplitude, wherein a first foot of the pair of feet is offset by 180 degrees from the periodic trajectory of a second foot of the pair of feet,
    wherein extending the feet is accomplished using a single actuator in each of the first foot and the second foot without additional actuators.

10. The method of claim 9, wherein the offset is changed from 180 degrees.

11. A walking robot comprising:
    a first rigid body comprising a first leg and a first foot and a second rigid body comprising a second leg and a second foot, wherein each of the first foot and the second foot has a rounded bottom surface,
wherein the first foot and the second foot are tangent to a surface when at rest;
a hip joint connecting the first rigid body to the second rigid body along an axis;
an actuator operable connected to the first rigid body and the second rigid body,
wherein the actuator rotates the first rigid body and the second rigid body around the axis;
wherein a center of gravity of the walking robot is below a center of curvature for the first foot and a center of curvature for the second foot.

12. The walking robot of claim 11, wherein the axis is above a center of curvature for the first foot and a center of curvature for the second foot.

13. The walking robot of claim 11, wherein the axis is behind a center of gravity of the walking robot.

14. The walking robot of claim 11, wherein a center of curvature for each of the first foot and the second foot are displaced laterally from a center of gravity of the walking robot.

15. A method of controlling a bipedal walking robot having a pair of feet with rounded bottom surface, each foot in the pair of feet rigidly connected to a leg and each leg connected to an actuator through a hip joint, the method comprising:

using a single actuator, lifting the feet in a periodic trajectory having an amplitude, wherein a first foot of the pair of feet is offset by 180 degrees from the periodic trajectory of a second foot of the pair of feet.

16. The method of claim 15, further comprising:

controlling forward walking and rotational movement using the single actuator.

17. The walking robot of claim 1, further comprising a single actuator connected to the hip joint for actuating the extension of the first foot and the second foot.

18. The walking robot of claim 17, excluding an additional actuator for active balancing.

* * * * *